(12) United States Patent
Lansberry et al.

(10) Patent No.: US 8,776,977 B2
(45) Date of Patent: Jul. 15, 2014

(54) DRIVE SYSTEM FOR MOBILE ROBOT ARM

(75) Inventors: Geoffrey B. Lansberry, Andover, MA (US); Lance L. Andrus, Southborough, MA (US); Brian DeStefano, Stoneham, MA (US)

(73) Assignee: Foster-Miller, Inc., Waltham, MA (US)

( * ) Notice: Subject to any disclaimer, the term of this patent is extended or adjusted under 35 U.S.C. 154(b) by 112 days.

(21) Appl. No.: 12/924,432

(22) Filed: Sep. 27, 2010

(65) Prior Publication Data
US 2012/0073930 A1 Mar. 29, 2012

(51) Int. Cl.
*F16D 13/42* (2006.01)
*F16D 23/12* (2006.01)

(52) U.S. Cl.
USPC ............. 192/70.23; 192/56.6; 192/150

(58) Field of Classification Search
USPC .................... 192/56.6, 150, 70.23
See application file for complete search history.

(56) References Cited

U.S. PATENT DOCUMENTS

| | | | | |
|---|---|---|---|---|
| 2,342,741 | A | * | 2/1944 | Lochhead .............. 192/3.55 |
| 4,685,861 | A | * | 8/1987 | Huetsch .............. 414/729 |
| 4,852,706 | A | * | 8/1989 | Pietrzak et al. ........... 192/223.1 |
| 7,104,375 | B2 | * | 9/2006 | Czysz .............. 192/48.92 |
| 2004/0238310 | A1 | * | 12/2004 | Friedrich et al. ........... 192/70.27 |
| 2005/0150736 | A1 | * | 7/2005 | Kataoka et al. ............. 192/54.5 |
| 2010/0158656 | A1 | | 6/2010 | Seavey |
| 2011/0005847 | A1 | | 1/2011 | Andrus et al. |

OTHER PUBLICATIONS

U.S. Appl. No. 12/316,311, filed Dec. 11, 2008, N. J. M. Seavey.

* cited by examiner

*Primary Examiner* — Rodney Bonck
*Assistant Examiner* — Stacey Fluhart
(74) *Attorney, Agent, or Firm* — Iandiorio Teska & Coleman, LLP (57) ABSTRACT

A drive system for each arm of a mobile robot, each drive system including a drive motor and an adjustable clutch system interconnected between its associated arm and the drive motor and having a high friction locked position for enabling direct drive of the arm by the drive motor and a reduced friction slip position for enabling manual movement of the associated arm without back-driving the drive motor.

15 Claims, 9 Drawing Sheets

DRIVE SYSTEM FOR MOBILE ROBOT ARM

FIELD OF THE INVENTION

This invention relates to a drive system for mobile robot arms including an adjustable clutch system.

BACKGROUND OF THE INVENTION

Mobile, remotely controlled robots are becoming increasingly popular for use by the military, SWAT units, and police and fire departments. They typically can include an arm with an end effecter, several cameras, several antennas, and a deployable mast. Frequently the end effector is a gripper, e.g. a pair of jaws that can be opened and closed on command to grasp objects such as debris, hazardous material, unexploded ordinance and the like. The larger robots even have the capability to grip an injured, downed, person by some personal paraphernalia such as a shirt collar and drag them out of harm's way to safety. Often these end effectors, cameras, tools and other devices may be mounted on an arm, typically articulated, with two or more arms, an upper arm and a lower arm, for example. In emergency or combat situations it is often necessary to collapse or extend the arm(s) by hand for loading and transport or deployment, respectively. With smaller less powerful mobile robots their arms may be manually manipulated by back-driving the drive motors. But in larger more powerful mobile robots the force required to manually extend or collapse the arm(s) by back-driving the motors is quite large and so may not be done as quickly as needed and may require more than average strength.

SUMMARY OF THE INVENTION

It is therefore an object of this invention to provide an improved drive system for a mobile robot arm.

It is a further object of this invention to provide such an improved drive system which enables direct drive of the arm(s) but quick and easy manipulation of the arms in a manual collapse or extension mode.

It is a further object of this invention to provide such an improved drive system which employs a clutch system which can be adjusted between a high friction positive locked condition and a lower friction slip mode wherein arm collapse and extension can be quickly and easily accomplished.

It is a further object of this invention to provide such an improved drive system which the slip mode can be set to a lower friction range where the arm(s) can be re-positioned to hold its own weight in any new position without total collapse.

It is a further object of this invention to provide such an improved drive system where the friction can vary relatively smoothly between positive lock and slip modes.

The invention results from the realization that a drive system for an arm of a mobile robot which enables positive direct drive and yet allows quick and easy manual extension and collapse of the arm can be achieved with a drive motor and an adjustable clutch system interconnected between its associated arm and the drive motor and having a high friction locked position for enabling direct drive of the arm by the drive motor and a reduced friction slip position for enabling manual movement of the associated arm without back-driving the drive motor.

The subject invention, however, in other embodiments, need not achieve all these objectives and the claims hereof should not be limited to structures or methods capable of achieving these objectives.

This invention in at least one embodiment features a drive system for each arm of a mobile robot, each drive system including a drive motor and an adjustable clutch system interconnected between its associated arm and the drive motor and having a high friction locked position for enabling direct drive of the arm by the drive motor and a reduced friction slip position for enabling manual movement of the associated arm without back-driving the drive motor.

In preferred embodiment there may be lower and upper articulated arms and there may be a lower drive system associated with the lower arm and an upper drive system associated with the upper arm. The clutch system may include a housing drivable by the drive motor, a stack of friction disks moveable with the housing and a plurality of clutch plates, interstitial of the friction discs and movable relative to the housing, an output shaft engaged and rotatable with the clutch plates, a pressure plate, a spider mechanism for urging the pressure plate to compress the friction disks and clutch plates together against the housing, a cover for constraining the friction disks, clutch plate, pressure plate and spider mechanism in the housing and an activator device for moving the spider mechanism between the locked and slip positions. The clutch system may further include a resilient spring member in the housing with the stack. The resilient spring member may be at the end of the stack in the housing. The resilient spring member may include elastomeric material. The spider member may include a plurality of fingers pivotably attached to a hub. The hub may be rotatable to radially extend and withdraw the fingers between locked and slip positions. The pressure plate may include a plurality of radial grooves corresponding to the fingers. The at least one of the grooves and fingers may be tapered to enable rotation of the hub to drive the fingers radially in and out to decrease and increase the force exerted by the pressure plate on the stack of friction discs and clutch plates. There may be a release mechanism for rotating the hub. The lower arm drive system may be fixed to and rotate the lower arm. The lower arm may house a chain drive for driving the upper arm and the chain drive may be driven by the upper arm drive system. There may be a second adjustable clutch mechanism and a second drive motor, each clutch system including an interlocking mechanism for mating with receptive interlocking mechanisms on the arm for tool free engagement of the arm between the clutch mechanisms. In the reduced friction slip position, the adjustable clutch system may support the arm's own weight.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
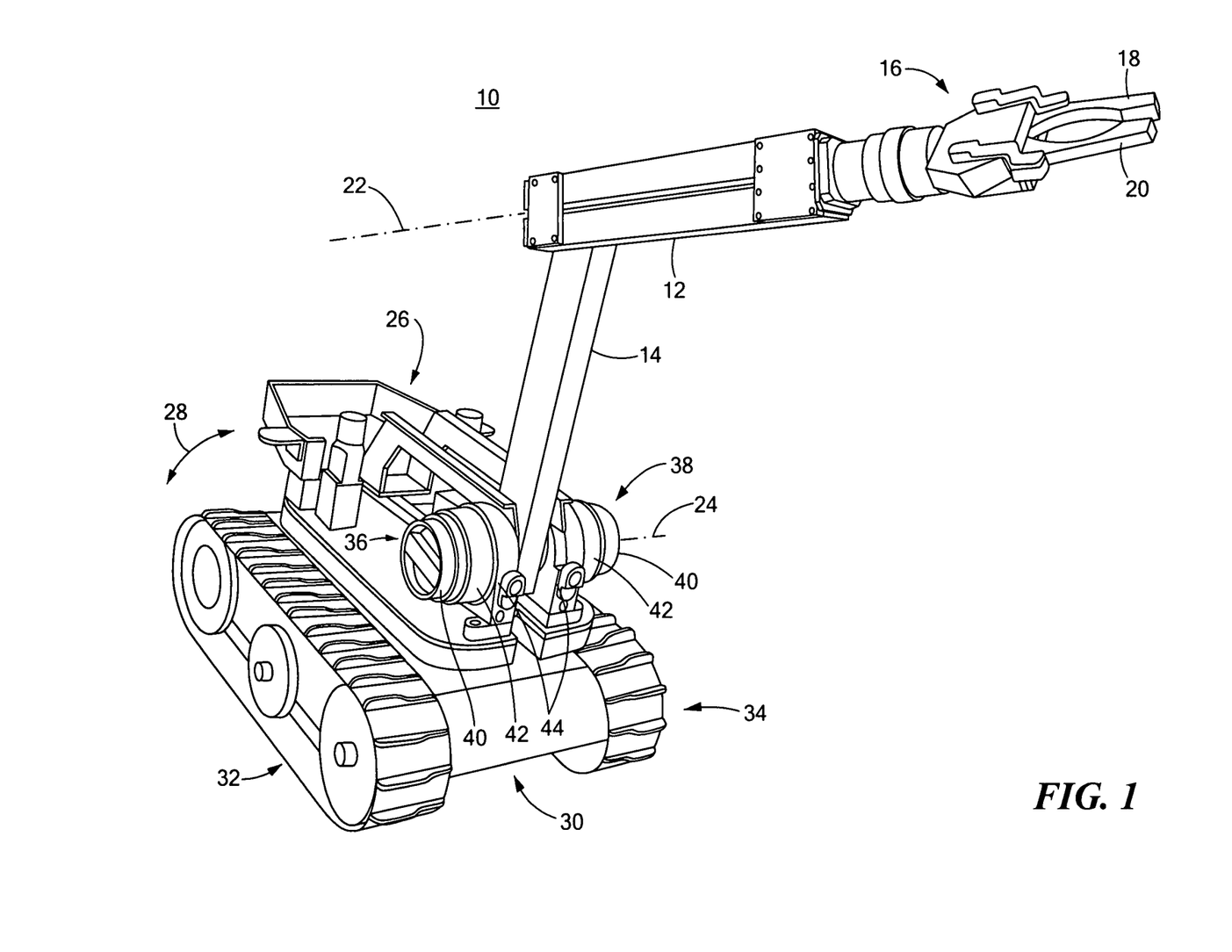
FIG. 1 is a diagrammatic three dimensional view of a mobile robot with articulated arms using two drive systems according to this invention.

There is shown in FIG. 1 a mobile robot 10 having a pair of articulated arms, upper arm 12, and lower arm 14. Upper arm 12 has an end effector 16 which, for example, includes a pair of jaws or grippers 18 and 20. Upper arm 12 rotates on axis 22 with respect to lower arm 14. Lower arm 14 rotates on axis 24 with respect to turret 26. Turret 26 rotates in either direction as indicated by arrows 28 on base 30 which includes, for example, driven treads 32 and 34. There are two drive systems according to this invention, lower arm drive system 36 and upper drive system 38. Each drive system includes a release member 40, clutch system 42 and worm drive 44.

Figure 2:
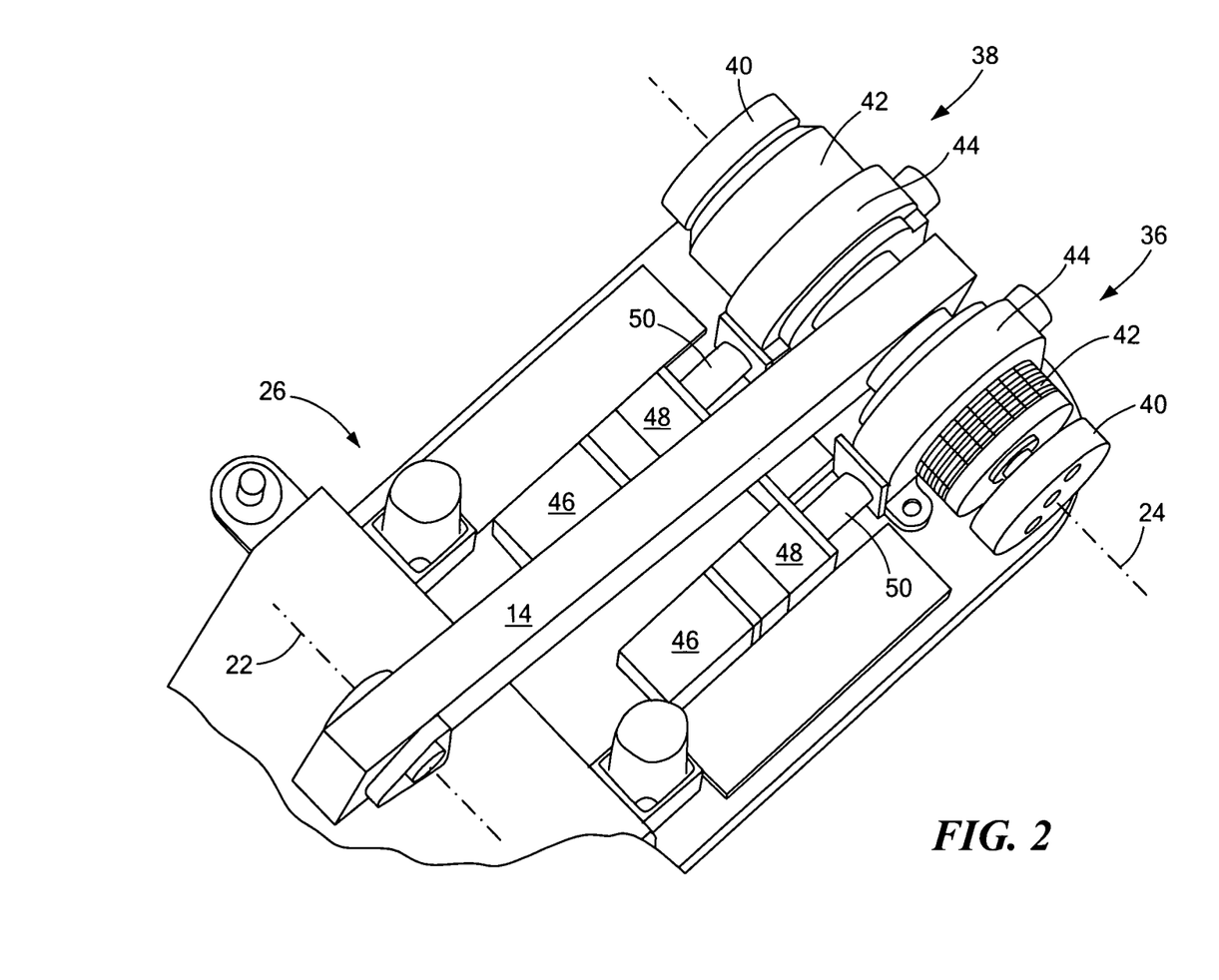
FIG. 2 is a three dimensional top view of a portion of the mobile robot of FIG. 1 with parts removed showing both drive systems including drive motors and clutches.
Figure 3:
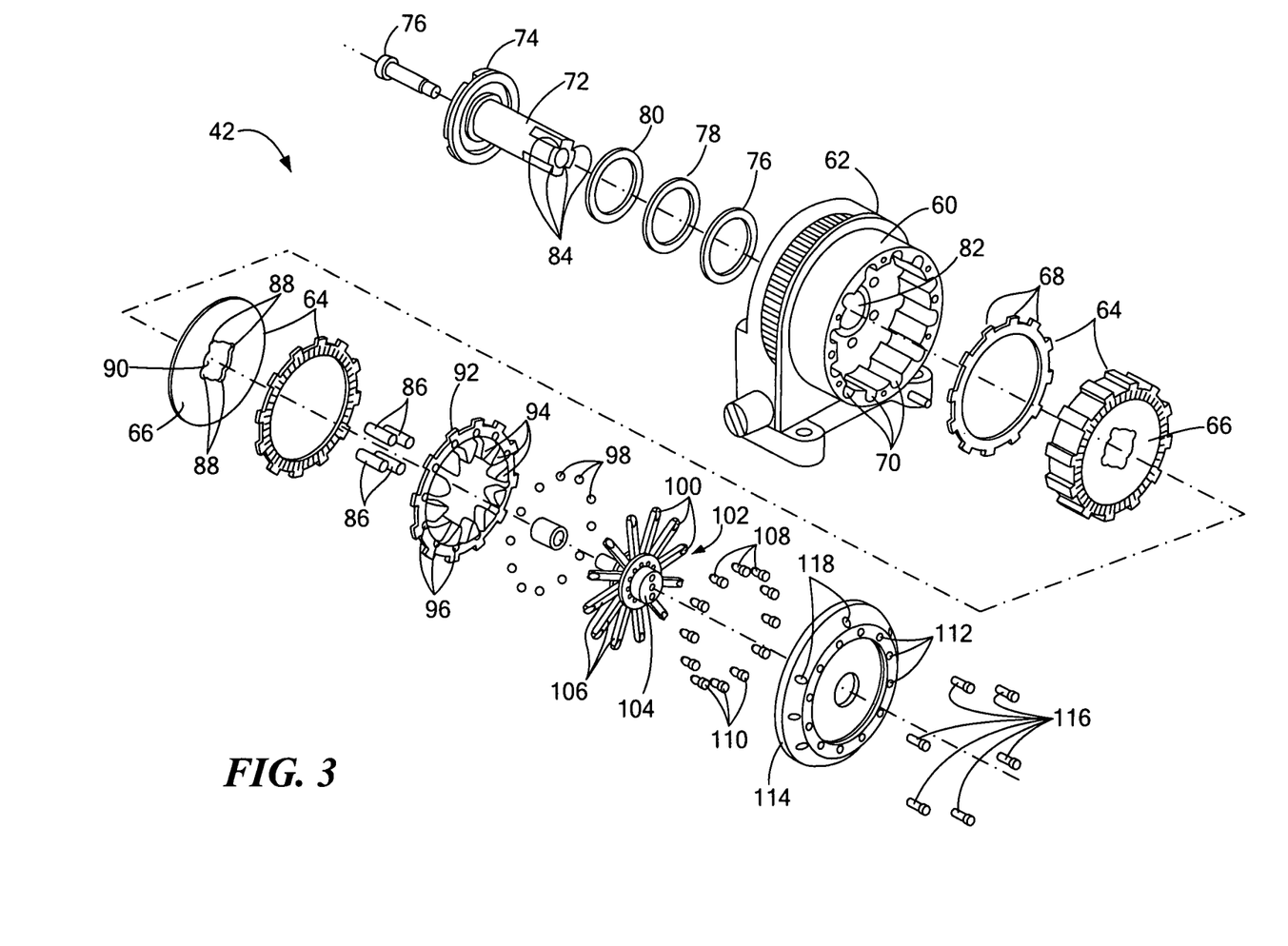
FIG. 3 is an exploded three dimensional view of a clutch system according to this invention.

Drive systems 36 and 38 further include drive motors 46, FIG. 2, and may include gear reducers 48 which through shafts 50 couple to worm drives 44. Drive systems 36 and 38 are identical mirror images of each other. Clutch system 42 and worm drive 44 of drive system 36 is shown in more detail in FIG. 3, where clutch system 42 includes a clutch housing 60 rotatable with respect to worm drive housing 62. A plurality of friction discs 64, for example eight, are stacked with interstitial clutch plates 66 and are mounted in clutch housing 60 where the teeth 68 of each friction disk 64 aligns with the splines 70 on the inside of clutch housing 60 so that they rotate with clutch housing 60. Clutch plates 66 do not rotate with housing 60. Rather clutch plates 66 rotate with shaft 72 which carries output drive plate 74, fastened in place by bolt 76, receives thrust bearing washer 76, thrust bearing cage 78 and another thrust bearing washer 80 and passes through bore 82 in worm drive housing 62 and clutch housing 60. Shaft 72 has four elongated recesses, 84, which receive four pins 86, which in turn engage the four curved corners 88 of the aperture 90 in each clutch plate 66. Thus, the clutch plates are fixed to rotate with shaft 72 and rotate relative to clutch housing 60. Pressure plate 92 includes a plurality of tapered slots 94, each one having at its radially outward tip a ball bearing recess 96 for receiving ball bearings 98. In this particular embodiment there are twelve slots 94, twelve ball bearing recesses 96 and twelve ball bearings 98 which accommodate the twelve fingers 100 of spider 102. Fingers 100 are pivotably attached to hub 104 at pivot pins 106. The backsides of fingers 100 are tapered and contain recesses to accommodate ball bearings 98. The front side of fingers 100 are also tapered and also have recesses to accommodate ball plugs 108 controlled by set screws 110. Set screws 110 are threadably received in holes 112 of spider cover 114, which is fastened by screws 116 through holes 118 to clutch housing 60.

Figure 4:
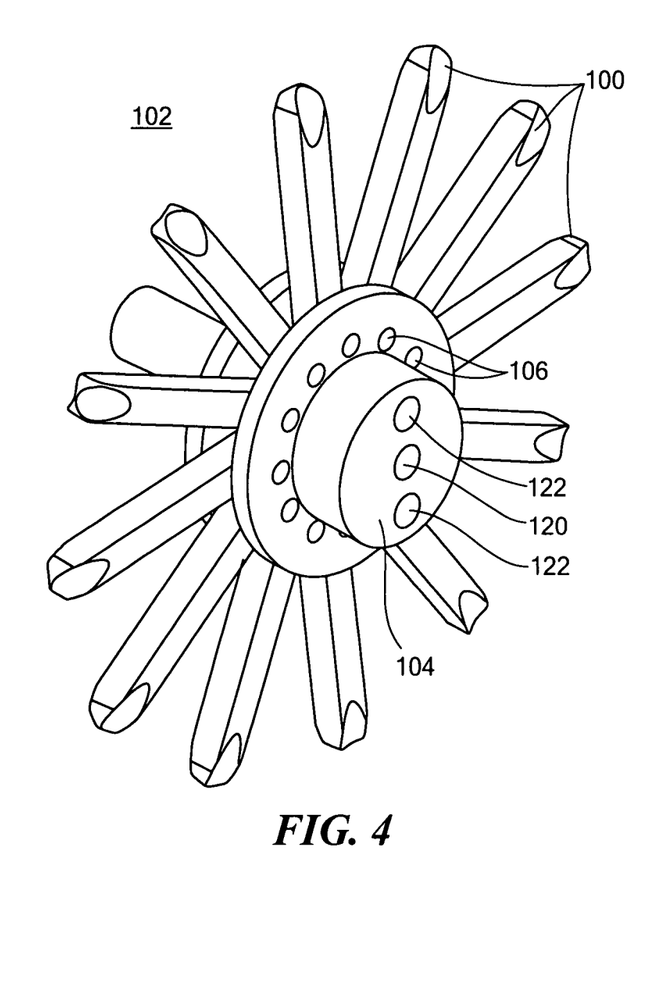
FIG. 4 is an enlarged three dimensional view of the spider mechanism of FIG. 3.
Figure 5:
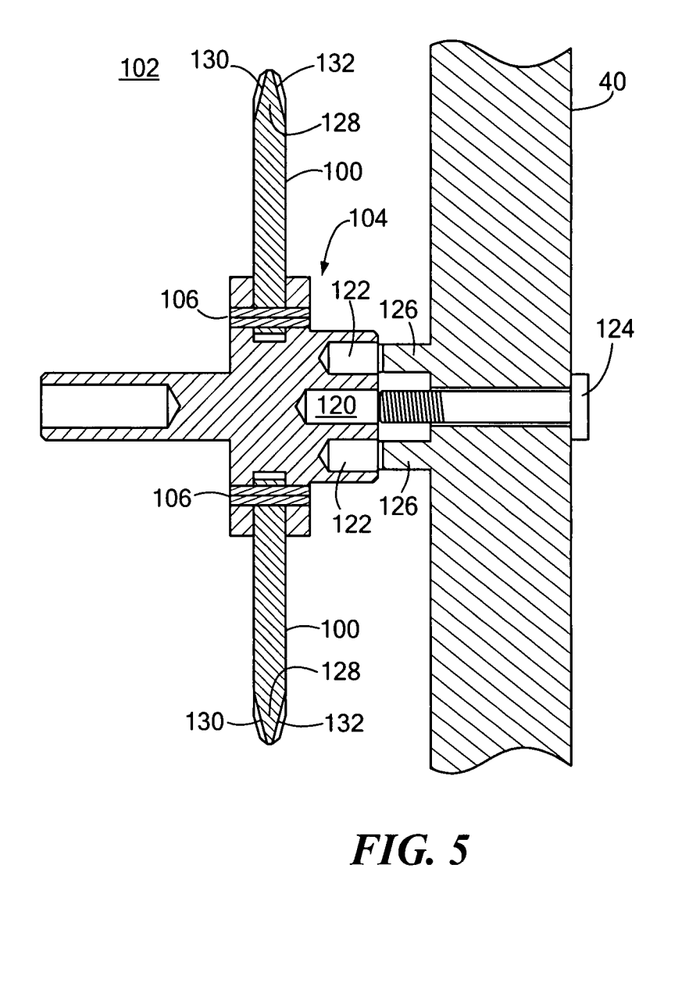
FIG. 5 is a side sectional view of the spider mechanism of FIG. 4.

Spider 102 is shown in more detail in FIG. 4 and FIG. 5 where the twelve fingers 100 and their pivots 106 are shown more clearly. Hub 104, FIG. 4, includes a center hole 120 for receiving a fastening bolt and two alignment holes 122 for receiving pins to prevent the release member from rotating relative to hub 120 so that it rotates only with it. The bolt fastener 124 that passes through release member 40 to be received in hole 120 is shown more clearly in FIG. 5 as are the alignment pins 126 which are received in holes 122. Also more clearly visible in FIG. 5 is the tapered shape at the tip 128 of each finger 100 along with the recess 130 on the back of each finger 100 that accommodates ball bearings 98 and the recess 132 on the front of each finger that accommodates ball plugs 108. Also shown more clearly in FIG. 5 are the pivots 106 that pivotably mount each finger 100.

Figure 6:
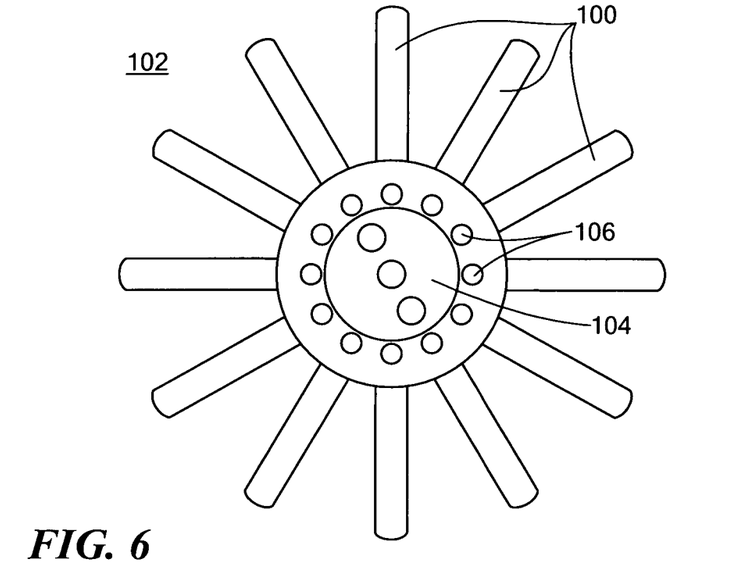
FIGS. 6 and 7 are schematic views of the spider mechanism of FIGS. 4 and 5 radially extended in the friction locked position and radially withdrawn in a slip position.
Figure 7:
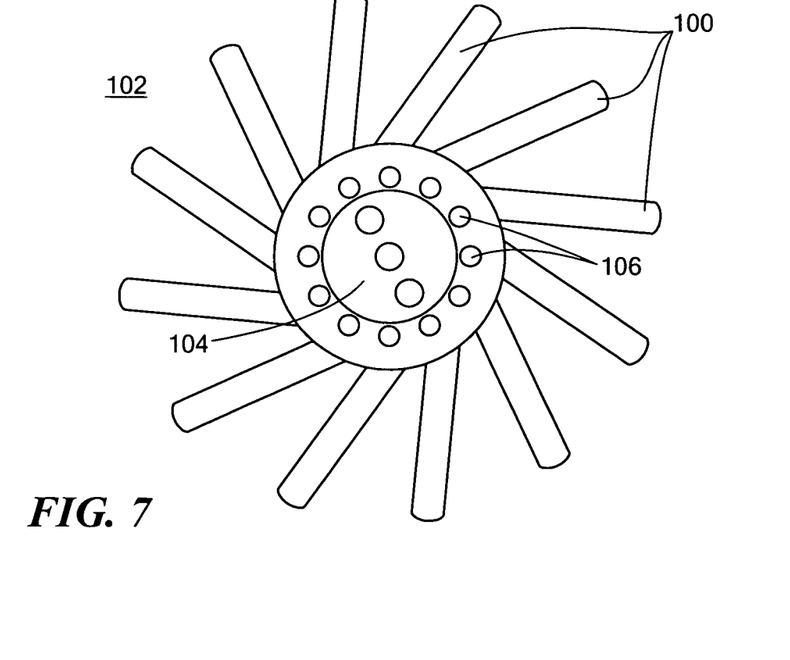

In operation in the positive lock position, FIG. 6, each of the fingers 100 is fully radially extended so that their tapered shape along with the tapered shape of slots 94 in pressure plate 92 enable a maximum force to be applied to the clutch plates and friction discs in the direct drive mode. However, with an easy rotation of release member 40, for example, a counter clockwise rotation as shown in FIG. 7, the fingers 100 rotate around their pivots 106 and are withdrawn radially inwardly in some measure thereby correspondingly decreasing the force on clutch plates 66 and friction disks 64. In this way the resistance can be reduced so that the arm or arms can be more easily manually collapsed or extended without having to back drive the motor 40 and/or gear drive 48 yet providing support for the arm's own weight. This also provides mechanical overload protection for the gears and arm members against collisions, jamming or exceeding load limits. The amount of force required in either case is determined in part by the number of fingers 100. The more fingers there are the less force there will have to be applied by each finger ad the less torque required to lock and release.

Figure 8:
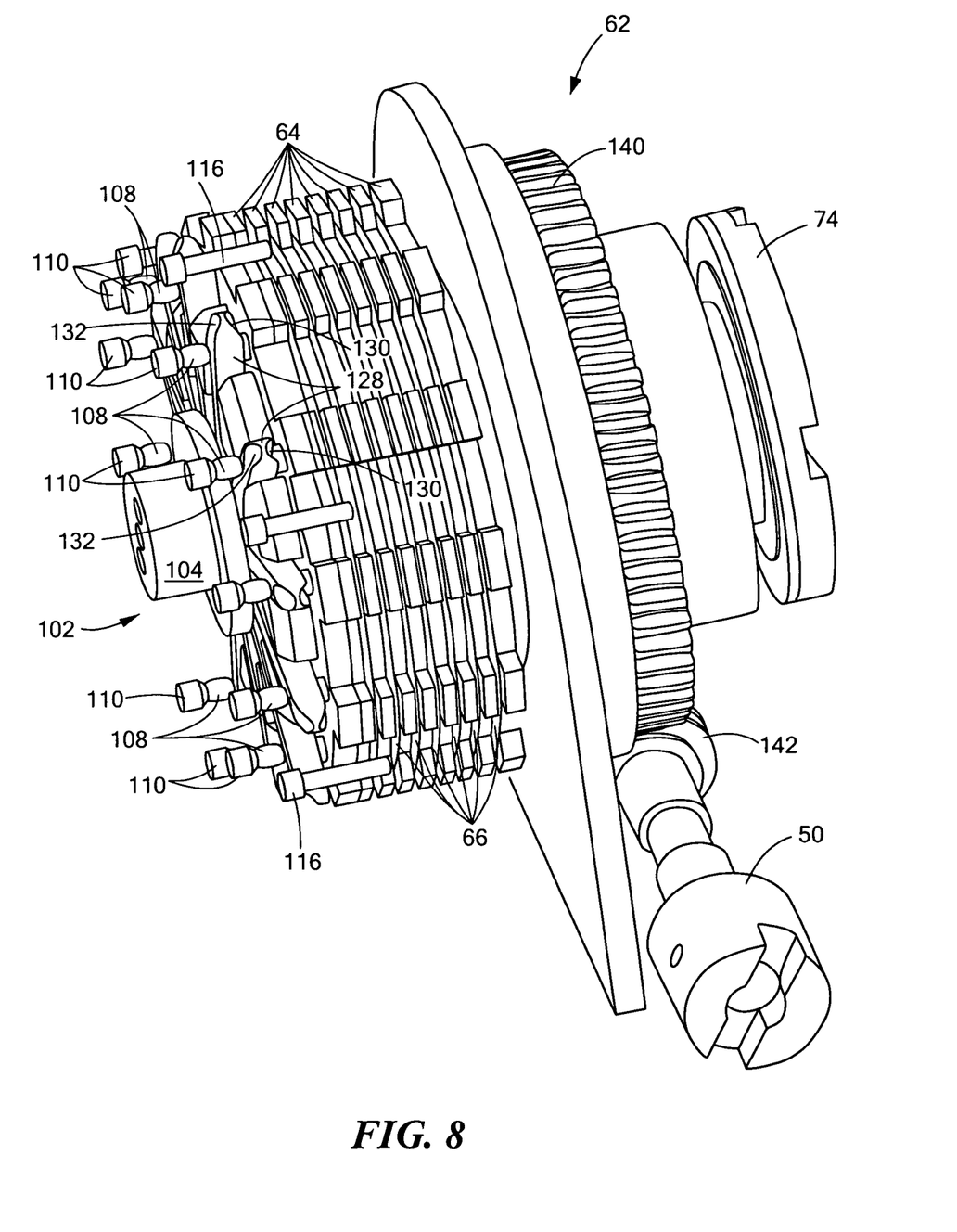
FIG. 8 is an enlarged three dimensional view from the clutch side of the clutch and worm gear drive system of FIG. 2.
Figure 9:
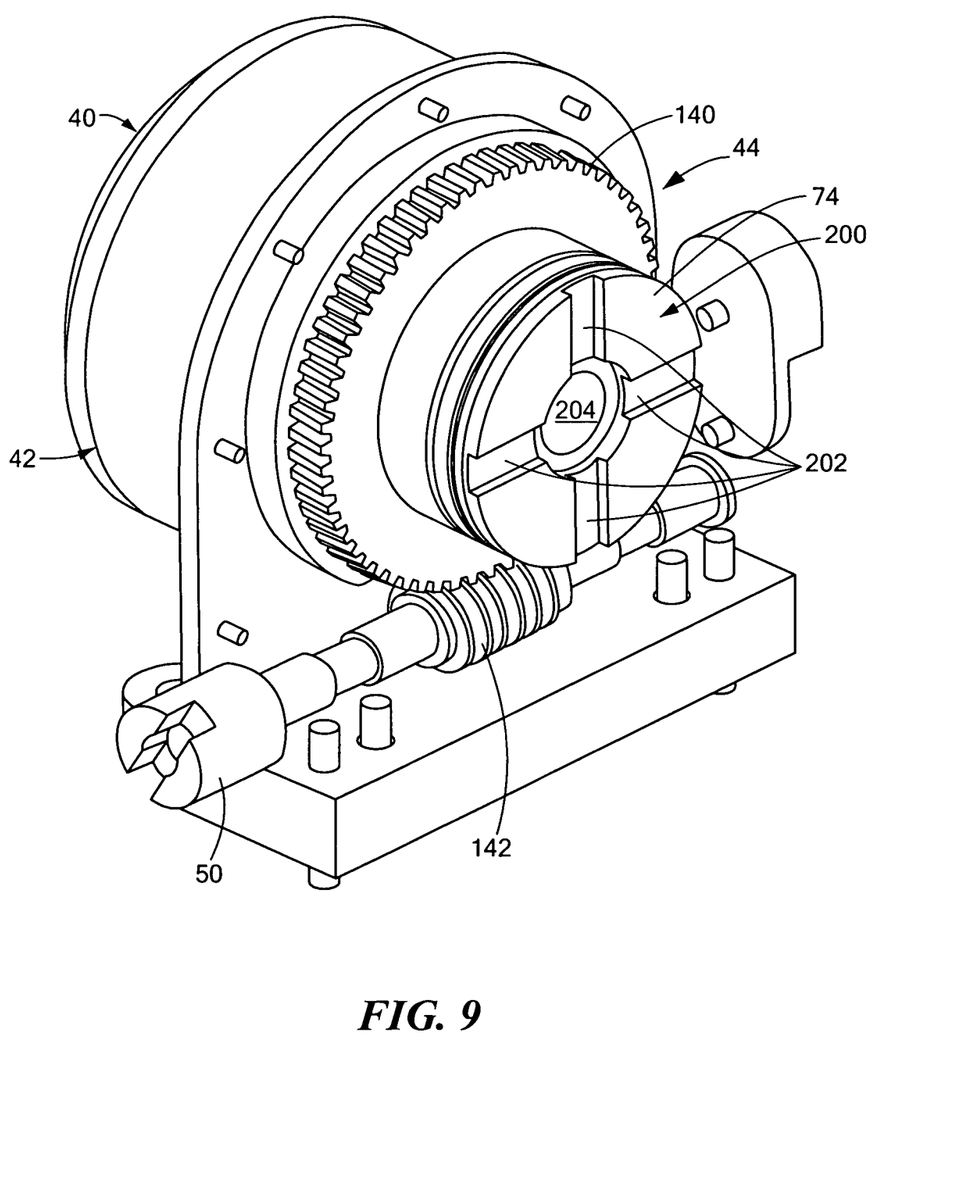
FIG. 9 is an enlarged three dimensional view from the worm gear drive side of the clutch and worm gear drive system of FIG. 2.
Figure 10:
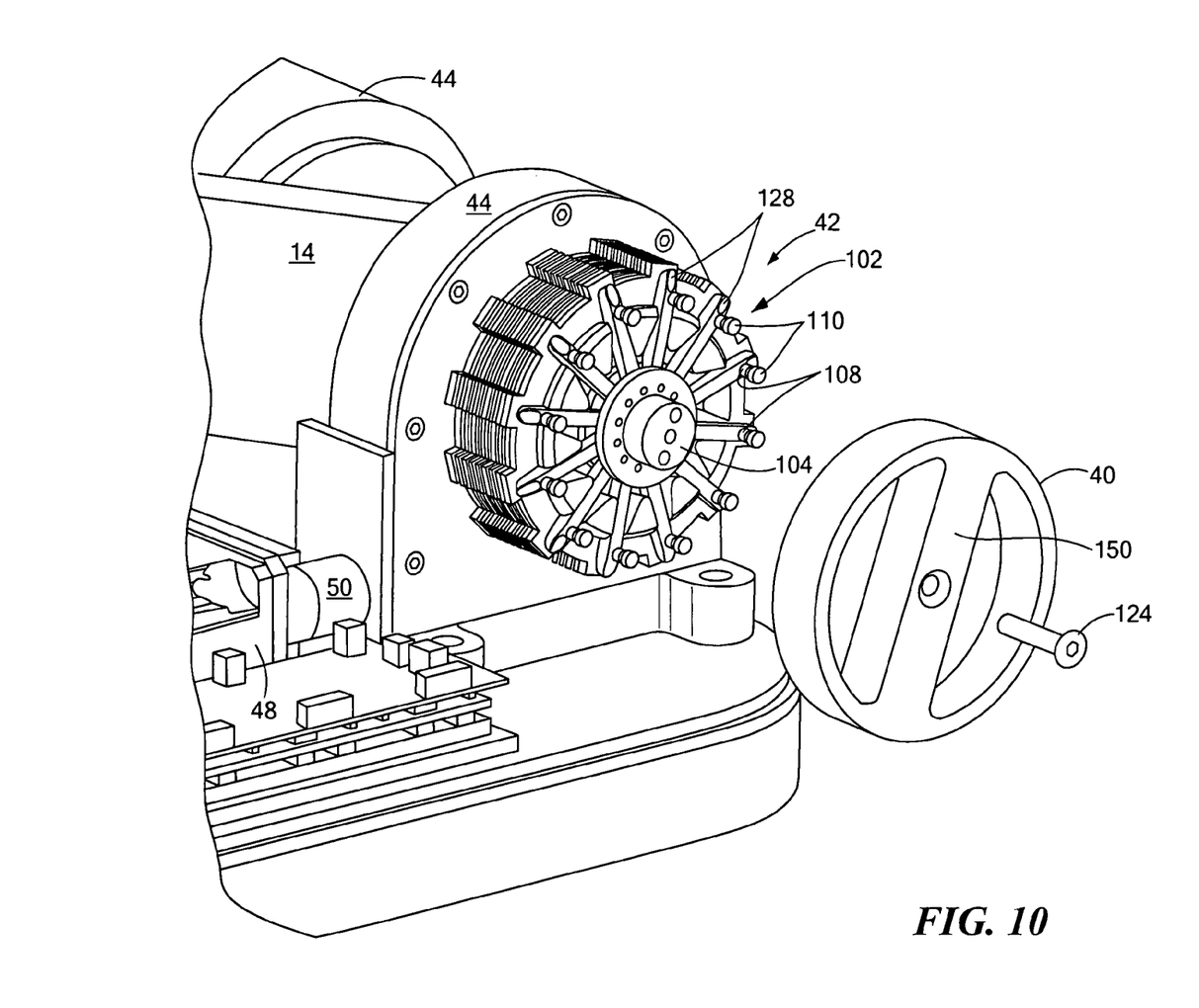
FIG. 10 is a three dimensional partially exploded view of a clutch system showing the release mechanism for rotating the hub of the spider mechanism.

Worm drive 44 is shown more clearly in FIG. 8, as including worm gear 140 driven by worm 142 driven in turn by shaft 50. Also shown more clearly in FIG. 8 are the ball plugs 108 and set screws 110 which control them. FIG. 9 shows another view of worm gear 140, worm 142, and output drive plate 74. Release member 40 is shown more clearly in FIG. 10 along with its mounting screw 124 where it is shown to have a cross bar 150 to facilitate manual gripping and rotating of release member 40.

Figure 11:
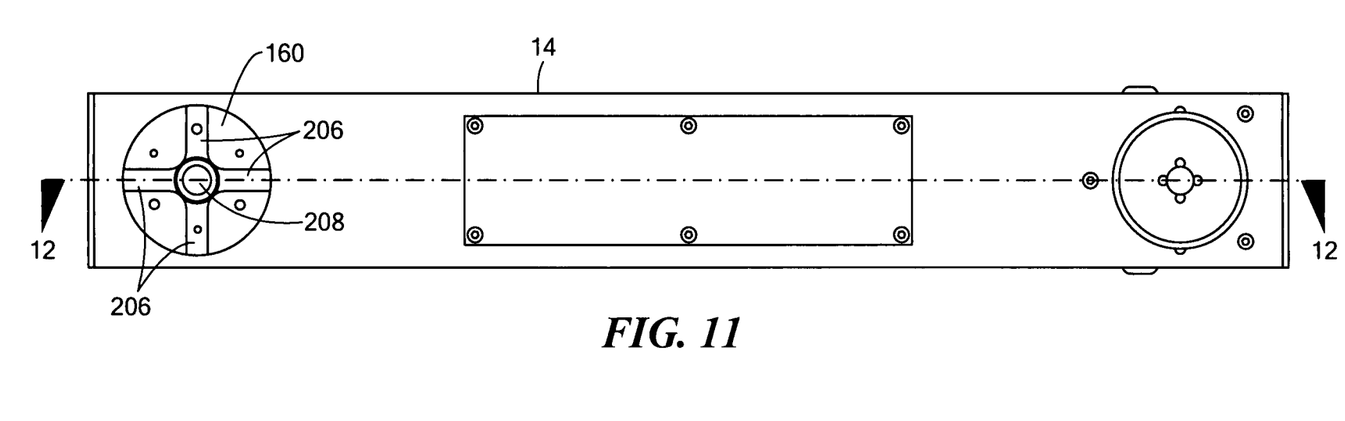
FIG. 11 is a side view of the lower arm of FIG. 1.
Figure 12:
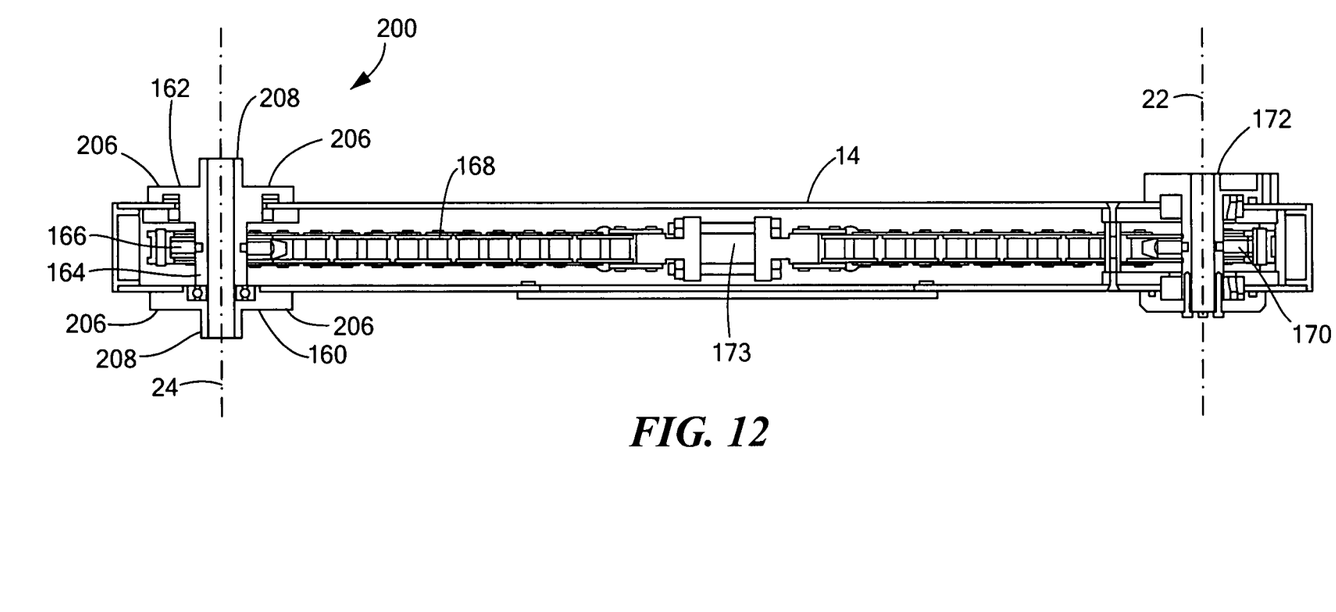
FIG. 12 is a sectional view along line 12-12 of FIG. 11.

The output plate 74 shown in FIGS. 8 and 9 engages with a receptor plate 160, FIG. 11, which is fixed to arm 14 so that as plate 74 rotates, plate 160 rotates with it and with plate 160. Arm 14 rotates as well, all about axis 24. Lower arm drive system 36 through its output plate 74 drives receptor plate 160 and this rotates arm 14 as previously indicated. Upper drive system 38 drives its output plate 74 which in turn drives receptor plate 162, FIG. 12. Receptor plate 162 has an integral shaft 164 which carries sprocket 166 that drives chain 168. Chain 168 rotates a second sprocket 170 which rotates the upper arm about axis 22. Sprocket 170 is fixed to a second drive plate 172 which rotates upper arm 12. See also FIG. 1. Chain tension is adjustable via tensioner 173. The use of two clutches 42, FIG. 2, one on either side of the arm 14 enables a fastener free engagement of arm 14 using the clutches themselves. Each clutch has an interlocking mechanism 200, FIG. 9, which for example has four radial recesses 202 and a center hole 204. These mate with the raised radial fins 206 and stud 208, respectively, shown in FIGS. 11 and 12.

One preferred robot chassis is disclosed in MODULAR MOBILE ROBOT, by Andrus et al. Ser. No. 12/316,311, filed Dec. 11, 2008 (FM-398J). A turret assembly is disclosed in ROBOT ARM ASSEMBLY by Nathaniel J. M. Seavey, Ser. No. 12/317,131, filed Dec. 18, 2008.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A drive system for an arm of a mobile robot, said drive system comprising:
   a drive motor; and
   an adjustable clutch system for interconnection between said arm and said drive motor, said clutch system including a spider mechanism which includes a plurality of fingers pivotably attached to a hub, said hub rotatable to pivot said fingers and to thereby radially extend said fingers from said hub to a high friction locked position whereby said fingers engage associated grooves included in said clutch system for enabling direct drive of said arm by said drive motor, and a release mechanism connected to said hub for rotating the fingers to withdraw said fingers radially inwardly for decreased engagement with said grooves to a reduced friction slip position for enabling manual movement of the arm without back-driving said drive motor.

2. The drive system of claim 1 in which said clutch system includes a housing drivable by said drive motor, a stack of friction disks moveable with said housing and a plurality of clutch plates, interstitial of said friction discs and movable relative to said housing; an output shaft engaged and rotatable with said clutch plates; a pressure plate including said grooves; said spider mechanism for urging said pressure plate to compress said friction disks and clutch plates together against said housing when the fingers are radially extended and alternately to decrease force on said pressure plate when the fingers are withdrawn radially inward.

3. The drive system of claim 2 in which said clutch system further includes a resilient spring member in said housing with said stack.

4. The drive system of claim 3 in which said resilient spring member is at the end of the stack in said housing.

5. The drive system of claim 3 in which said resilient spring member includes elastomeric material.

6. The drive system of claim 2 in which said pressure plate includes a plurality of radial grooves corresponding to said fingers.

7. The drive system of claim 6 in which said at least one of said grooves and fingers are tapered to enable rotation of said hub to drive said fingers radially in and out to decrease and increase the force exerted by said pressure plate on said stack of friction discs and clutch plates.

8. The drive system of claim 2 including a cover for constraining said friction disks, clutch plate, pressure plate and spider mechanism in said housing; and an activator device for moving said spider mechanism between said locked and slip positions.

9. The drive system of claim 1 in which the release mechanism rotates said hub.

10. The drive system of claim 1 in which said drive system is fixed to and rotates said arm.

11. The drive system of claim 10 in which said arm houses a chain drive for driving another arm and said chain drive is driven by a drive system associated with said another arm.

12. The drive system of claim 1 further including a second adjustable clutch mechanism and a second drive motor for a second arm, each clutch system including an interlocking mechanism for mating with receptive interlocking mechanisms on a respective arm for tool free engagement of said arm between said clutch mechanisms.

13. The drive system of claim 1 in which said adjustable clutch system in the reduced friction slip position provides support for the arm's weight.

14. The drive system of claim 1 in which the release mechanism is user operable.

15. A drive system for an arm of a mobile robot, said drive system comprising:
   a drive motor; and
   an adjustable clutch system for interconnection between said arm and said drive motor, said clutch system including a spider mechanism which includes a plurality of fingers pivotably attached to a hub, said hub rotatable to pivot said fingers and to thereby radially extend said fingers from said hub to a high friction locked position for enabling direct drive of said arm by said drive motor, and said hub alternately rotatable to withdraw said fingers radially inwardly to a reduced friction slip position for enabling manual movement of the arm without back-driving said drive motor, said clutch system also including a housing drivable by said drive motor, a stack of friction disks moveable with said housing and a plurality of clutch plates, interstitial of said friction discs and movable relative to said housing; an output shaft engaged and rotatable with said clutch plates; a pressure plate including a plurality of radial grooves corresponding to said fingers in which at least one of said grooves and fingers are tapered to enable rotation of said hub to drive said fingers radially in and out to decrease and increase the force exerted by said pressure plate on said stack of friction discs and clutch plates; said spider mechanism for urging said pressure plate to compress said friction disks and clutch plates together against said housing and alternately to decrease force on said pressure plate; a cover for constraining said friction disks, clutch plate, pressure plate and spider mechanism in said housing; and an activator device for moving said spider mechanism between said locked and slip positions.

* * * * *